Aug. 2, 1932.  L. H. HILL  1,869,811
FLOW INDICATOR
Original Filed Sept. 8, 1923  2 Sheets-Sheet 1
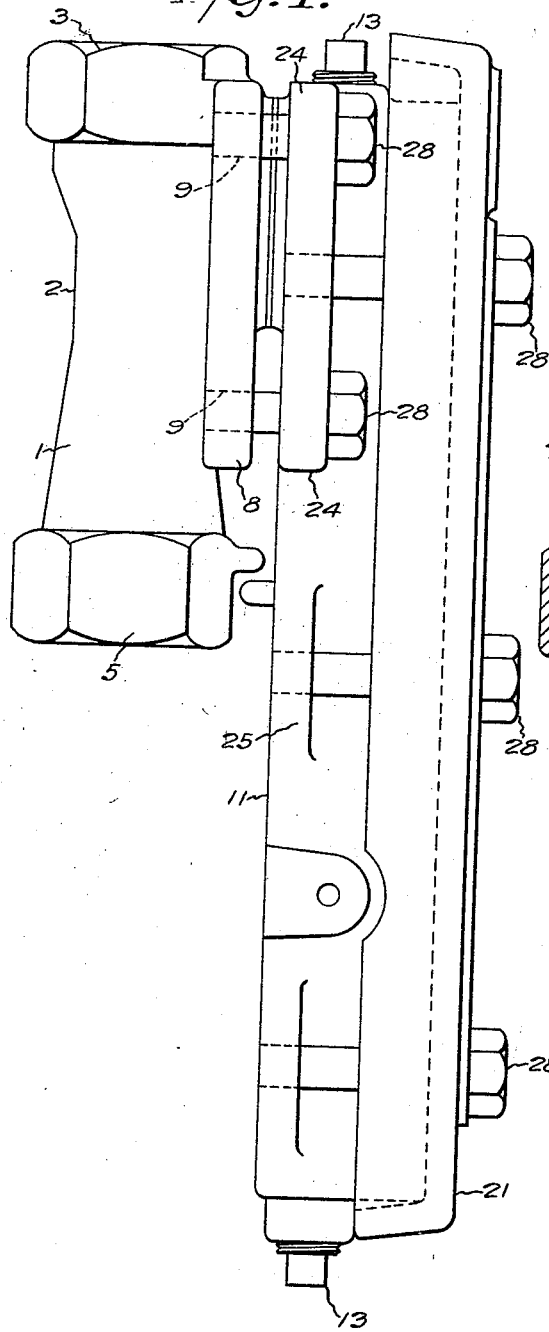
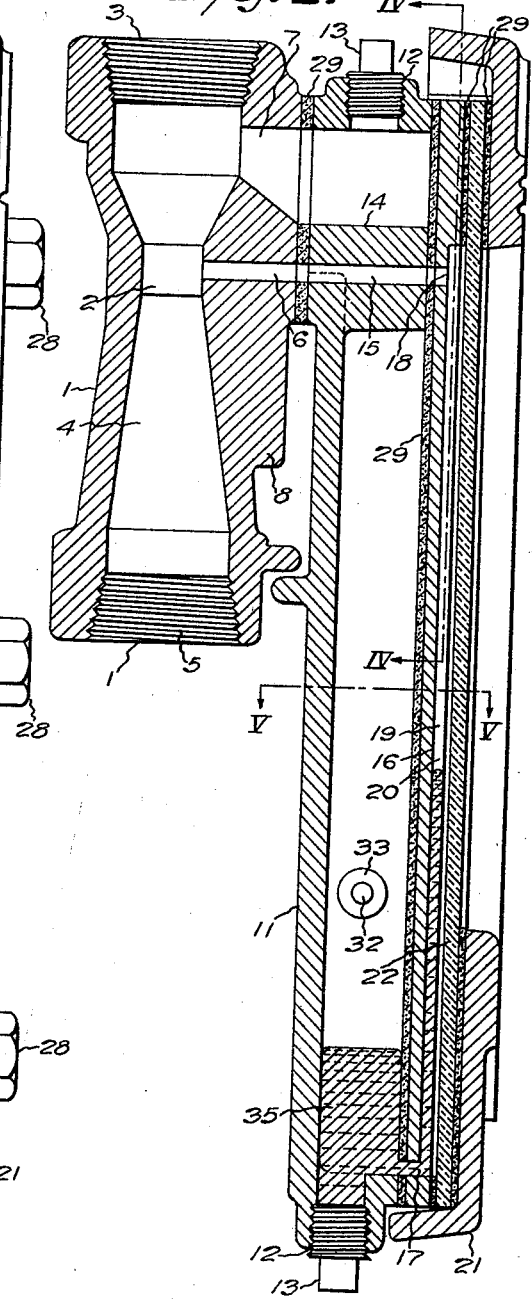
INVENTOR
Leland H. Hill
BY
Wesley G. Carr
ATTORNEY Aug. 2, 1932.   L. H. HILL   1,869,811
FLOW INDICATOR
Original Filed Sept. 8, 1923   2 Sheets-Sheet 2
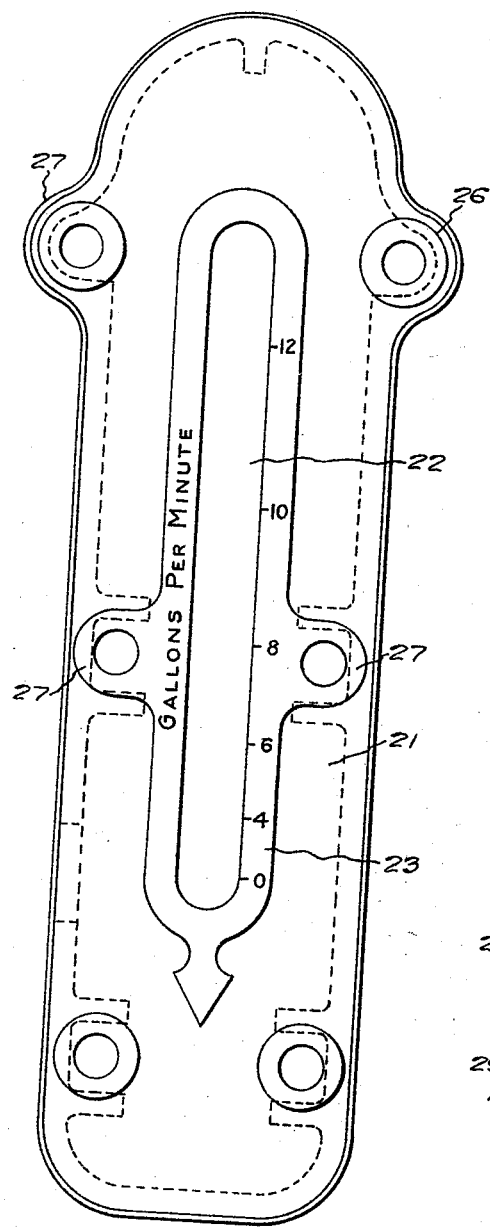
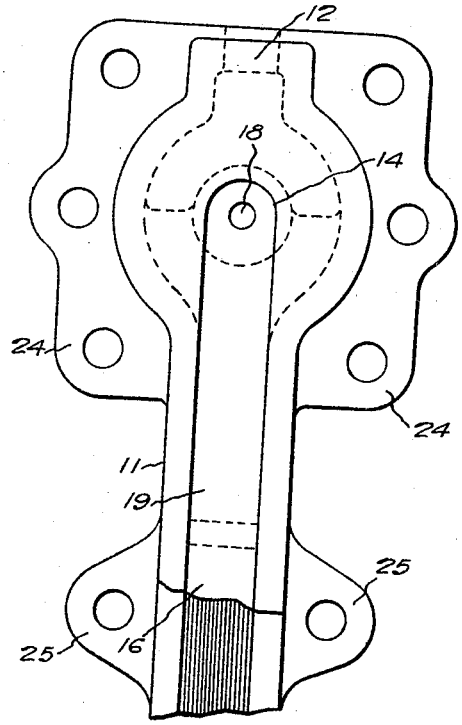
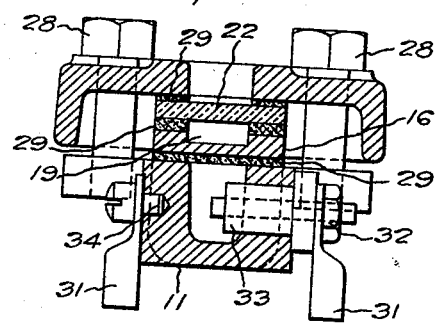
INVENTOR
Leland H. Hill
BY
Wesley G. Carr
ATTORNEY Patented Aug. 2, 1932

1,869,811

UNITED STATES PATENT OFFICE

LELAND H. HILL, OF SHARON, PENNSYLVANIA, ASSIGNOR TO WESTINGHOUSE ELECTRIC & MANUFACTURING COMPANY, A CORPORATION OF PENNSYLVANIA

FLOW INDICATOR

Original application filed September 8, 1923, Serial No. 661,550. Divided and this application filed June 24, 1927. Serial No. 201,065.

My invention relates to a device for indicating a condition, as the velocity or amount of fluid traversing a conduit system and comprehends a combined structure comprising a device for producing a pressure differential, as a Venturi tube, and an indicating device, as a manometer.

One object of my invention resides in the provision of a combined Venturi tube and manometer of such structural form as to be readily mounted as a unit in or on a pipe line.

It is characteristic of my invention that in a structure, as aforesaid, the Venturi tube serves as the support for the manometer, both structures comprising passages suitably maintained in alignment, as by bolts passing through flanges disposed, respectively, on the Venturi tube and manometer.

My invention resides in the combined or composite structure of the character hereinafter described and claimed.

This application is a division of my prior application Ser. No. 661,550, filed Sept. 8, 1923.

For an illustration of one of the forms my apparatus may take, reference is to be had to the accompanying drawings, in which Figure 1 is a side elevational view of a combined Venturi tube and manometer embodying my invention.

Fig. 2 is a sectional view thereof.

Fig. 3 is a face view of a manometer embodying my invention.

Fig. 4 is a fragmentary sectional view of my improved manometer taken along the line IV—IV in Fig. 2.

Fig. 5 is a cross-sectional view of the manometer taken along the line V—V in Fig. 2.

In the several figures of the drawings, similar reference numerals indicate like parts.

In the preferred embodiment of my invention, I provide a Venturi tube that is adapted for insertion in a fluid transmitting line. The Venturi tube 1 is characterized by having an intermediate section 2, or throat portion, of reduced cross-sectional area. Above the section 2, in the direction of fluid movement, the tube 1 broadens out into a threaded portion 3 which is of the diameter of the connecting pipe. Below the section 2, the tube expands with a uniform tapered surface 4 to a threaded portion 5 for connection to the associated connecting pipe. The wall of the tube 1 is pierced by an aperture 6 at the mid-point of the section 2, while a larger aperture 7 extends through the wall of the tube 1 at a point above the section 2.

That portion of the tube 1 through which the apertures 6 and 7 extend is thickened into a flange 8 which is provided with a plurality of bolt holes 9.

The manometer comprises a base member 11 which is in the form of a shallow receptacle, the end walls of which are provided with apertures 12 for the reception of threaded plugs 13. A lug 14 extends upwardly from the bottom of the base member 11 and is flush with the upturned edges thereof. The lug 14 is provided with a longitudinally extending aperture 15 of the same diameter as the aperture 6 and that registers therewith.

A cover member or plate 16 is adapted to be fitted over the upstanding edges of the base member 11 and is provided with apertures 17 and 18, the latter being of the same diameter as the aperture 15. The plate 16 is provided with a longitudinally extending groove 19. A glass plate 22 is disposed over the groove 19 to therewith provide a chamber 20. The plate 22 is held in position by a cover member 21 having an opening therein extending along the chamber 20. A suitable scale 23 may be provided on the cover member 21 adjacent to the glass plate 22.

The base member 11 is provided with a plurality of extending flanges 24 and 25 which co-operate, respectively, with the flange 8 on the tube 1 and apertured portions 26 and 27 on the cover member 21 for the reception of suitable bolts 28 to secure the manometer and the Venturi tube in their assembled position. The several metallic portions of the manometer and Venturi tube are packed by suitable gaskets 29.

In Fig. 5, is shown a pair of terminals 31 which may be connected to any external electrical circuit in order to operate an alarm. One of the terminals 31 is attached to the stationary contact member 32 which extends through an opening in the base member 11 but is suitably insulated, as at 33, therefrom. The other terminal 34 is secured directly to the wall of the base member 11. The chamber defined by the base member 11 and the cover member or plate 16 is filled with suitable fluid 35, such as mercury, a portion of which flows through the aperture 17 into the chamber 20.

The operation of my improved Venturi tube and manometer is as follows: A column of fluid in passing through the Venturi tube 1 enters by the connection 3 and departs by the connection 5 after having passed through the throat portion 2. It is a well known fact that the fluid above the throat portion 2 is under a greater pressure than the portion at that section. Also, the velocity of the fluid above the section 2 is less than the velocity of the fluid at the section 2. The difference in pressure above and below the portion 2 is proportional to the amount of fluid traversing the Venturi tube 1.

This difference in pressure is transmitted to the manometer. A certain portion of the fluid from the Venturi tube traverses the aperture 7 and moves into the chamber defined by the base member 11 and the plate 16. This fluid tends to displace the mercury 35 which moves upwardly in the chamber 19. However, another column of fluid moves from the portion 2 through the passageway formed by the apertures 6, 15 and 18 into the chamber 20 and exerts a back pressure on the column of mercury. When a sufficient amount of mercury has been forced into the chamber 20, to equalize the difference between the pressures in the aperture 7 and the aperture 6, the mercury column will come to rest. When the height of the column of mercury in the chamber 20 is read on the properly indicated scale 23, a direct measure of the amount of fluid traversing the Venturi tube 1 is given.

In order to magnify slight movements of the mercury in the chamber defined by the base member 11 and the cover member 16, it has been found advisable to make the cross-sectional area of the chamber 20 very materially smaller.

In the event that an electric alarm is desired to be given when the column of mercury in the main chamber has reached a predetermined level, contact is made or broken, as the case may be, between the stationary contact member 32 and the contact member 34 embedded in the member 11.

It will thus be seen that I have provided a combined Venturi tube and manometer which are of substantially unitary structure when assembled and which comprise a small number of parts, each of said parts being of suitable design for manufacturing purposes.

I do not wish to be restricted to the specific circuit connections or arrangement of parts herein set forth, as various modifications thereof may be effected without departing from the spirit and scope of my invention. I desire, therefor, that only such limitations shall be imposed as are indicated in the appended claims.

I claim as my invention:

1. A unitary structure for indicating the flow of a fluid traversing a pipe line including a Venturi tube for insertion in said pipe line, said tube having high and low-pressure openings in a side wall thereof, a manometer for said Venturi tube having a wall provided with openings corresponding to the openings in said Venturi-tube wall, and means for securing said walls in adjacent sealed relation, whereby said corresponding openings form individual passages between said tube and said manometer.

2. A unitary structure for indicating the flow of a fluid traversing a pipe line including a Venturi tube for insertion in said pipe line, said tube having a plane side wall and high and low-pressure openings in said wall, a manometer for said Venturi tube having a plane wall provided with openings corresponding to the openings in said Venturi-tube wall, and means for securing said walls in adjacent sealed relation, whereby said corresponding openings form individual passages between said tube and said manometer.

3. A unitary structure for indicating the flow of a fluid traversing a pipe line including a Venturi tube having high and low-pressure openings in a side wall thereof, a manometer for said tube having a wall provided with openings corresponding to the openings in said Venturi tube wall, and means including a gasket between the walls for securing the walls in adjacent sealed relation, whereby said corresponding openings form individual passages between said tube and said manometer.

4. A unitary structure for indicating the flow of a fluid traversing a pipe line including a Venturi tube having high and low-pressure openings in a side wall thereof, a manometer for said tube having a wall provided with openings corresponding to the openings in said Venturi tube wall, said walls having registering apertured extensions, and means including bolts cooperating between said extensions for securing the walls in adjacent sealed relation, whereby said corresponding openings form individual passages between said tube and said manometer.

5. A unitary structure for indicating the flow of a fluid traversing a pipe line including a Venturi tube having high and low-pressure openings in a side wall thereof, a manometer for said tube having a wall provided with openings corresponding to the openings in said Venturi tube wall, said walls having registering apertured extensions, and means including a gasket between the walls and bolts cooperating between said extensions for securing the walls in adjacent sealed relation, whereby said corresponding openings form individual passages between said tube and said manometer.

In testimony whereof, I have hereunto subscribed my name this 16th day of June, 1927.

LELAND H. HILL.